Patented Jan. 19, 1932

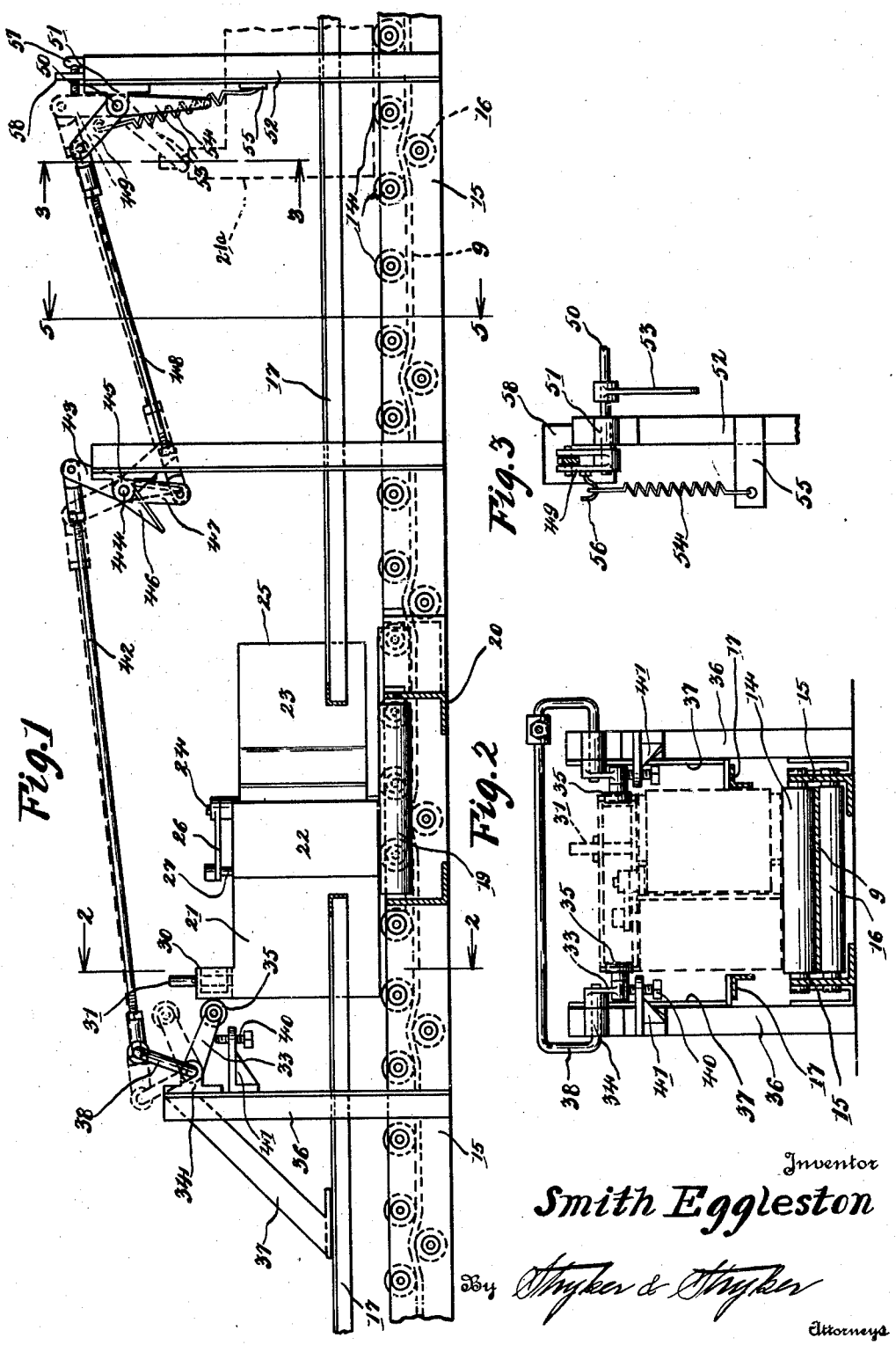

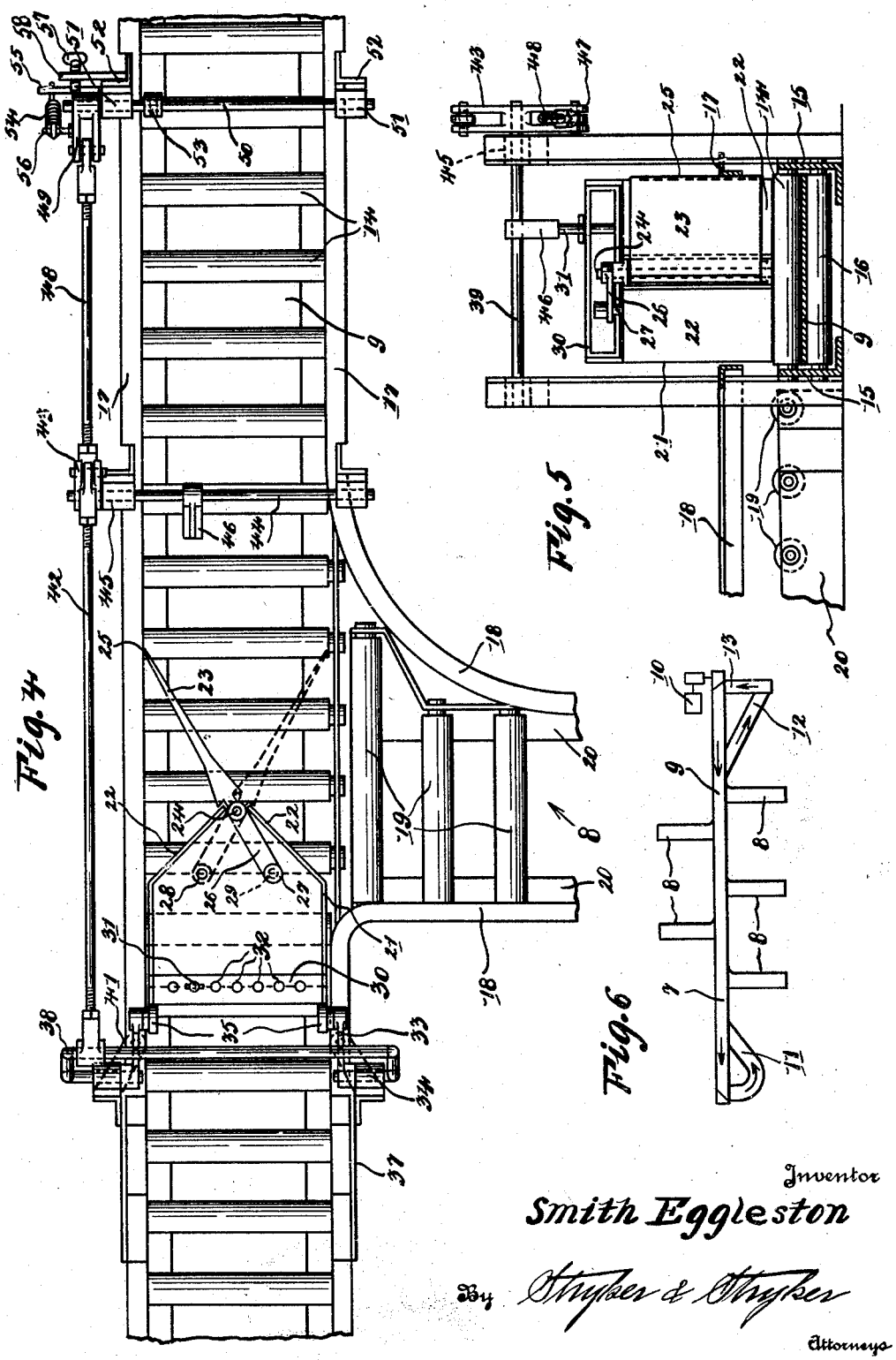

1,842,349

UNITED STATES PATENT OFFICE

SMITH EGGLESTON, OF ST. PAUL, MINNESOTA, ASSIGNOR TO STANDARD CONVEYOR COMPANY, OF NORTH ST. PAUL, MINNESOTA, A CORPORATION OF MINNESOTA

CONVEYER SYSTEM WITH PILOT CARS

Application filed February 18, 1931. Serial No. 516,638.

This invention relates to a conveyer system of the type having a main conveyer and sidings, and means for automatically delivering boxes, sacks or other packages or goods to selected sidings, the system being particularly designed for use where the goods are of such nature as to make it impractical to place each unit or package in a carrier having means thereon for controlling the destination of the contents.

It is frequently desirable to deliver a series of more or less bulky objects to one siding and then to deliver another series to another siding automatically. This has been accomplished heretofore by providing pilot cars which are placed on the main conveyer, at a despatching point, in advance of a group of articles to be transported, said car having selecting devices thereon to operate diverting mechanism at the sidings. The pilot cars are usually diverted from the main conveyer to the selected siding where the articles or packages are delivered, and this makes it necessary to return the cars over a relatively circuitous route, or to manually place them on a conveyer for returning them to the despatching point.

It is my object to provide a conveyer system with combination pilot and diverter cars, each car having means thereon for selecting the siding where packages or articles are to be delivered and for diverting the same to the siding.

A further object is to provide novel and efficient means for controlling the operation of the pilot cars on the main conveyer whereby automatic diverting of packages or articles separate from the cars at selected sidings or branch conveyers is effected.

Another object is to provide combined pilot cars and diverters of the class described adapted to coact with branch conveyers or sidings at either side of the main conveyer.

The invention also includes certain other novel features of construction which will be more fully pointed out in the following specification and claims.

In the accompanying drawings, which illustrate the best form of my system at present known to me—

Figure 1 is a side elevation of a portion of the main conveyer adjacent to one of the sidings with the pilot car in operative position thereon;

Fig. 2 is a transverse section through the main conveyer taken on the line 2—2 of Fig. 1, the position of the plot car being indicated in dotted lines;

Fig. 3 is a fragmentary vertical section taken on the line 3—3 of Fig. 1;

Fig. 4 is a plan view of the mechanism shown in Fig. 1;

Fig. 5 is a vertical section taken on the line 5—5 of Fig. 1; and

Fig. 6 is a diagrammatic plan view of a typical conveyer system to which my novel diverting mechanism may be applied.

As shown in Fig. 6, my device is applied to a system having a main conveyer 7 and branch conveyers or sidings 8 extending from the sides of the main conveyer. An endless conveyer belt 9 is adapted to be driven by a motor 10. The upper and lower reaches of the belt 9 may both be employed for transporting packages or other articles of merchandise and in order to form an endless path for the merchandise a gravity section 11 of the conveyer is arranged, in well-known manner, to carry the packages from the upper reach at the delivery end thereof to the lower reach. The lower reach delivers the cars and goods to an inclined conveyer 12 for raising them to a belt 13 adapted to return them to the upper reach of the main conveyer. As systems of this general type are well known in this art, it is deemed unnecessary to describe the details of the conveyers 11, 12 and 13.

As shown in Figs. 1 to 5, inclusive, the main conveyer is of the "live roller" type having a belt 9 arranged to frictionally engage the lower peripheries of a series of rollers 14. These rollers are supported in spaced parallel relation to each other between side rails 15 and a series of rollers 16 are placed beneath the belt 9 to retain it in driving engagement with the rollers 14. A guide bar 17 is mounted above each of the rails 15 to direct the packages or other objects and pilot cars along the main conveyer. Similar guide bars 18 are arranged at each siding 8, the latter bars being arranged in continuation of the bars 17. Rollers 19 are provided to support articles or packages on the sidings and these rollers may be supported in well-known manner between side rails 20 which, preferably, slope away from the main conveyer to convey the packages by gravity.

Cars 21 are provided to travel along the main conveyer independently of the packages or other articles or merchandise to be conveyed. At the rear of each car 21, oblique sides 22 constitute diverter members for directing articles to the sidings. A diverter flap 23 is pivoted on a vertical shaft 24 to extend in continuation of either of the sides 22. The rear edge 25 of the flap 23 may be positioned in contact with, or closely adjacent to, either of the guide bars 17 opposite a siding and the diverting surfaces of the sides 22 and flap 23 are preferably disposed vertically. To retain the flap 23 in either of two selected positions, said flap is fixed on the shaft 24 and a crank 26, which is fast on the upper end of said shaft, carries a vertically movable pin 27 to engage the top of the car in a hole 28 or 29. Along the upper front corner of the car 21, a support 30 for a selector pin 31 is mounted. As best shown in Fig. 4, the support 30 is formed with a series of sockets 32 for the pin 31 so that said pin may be placed in any of a number of positions differently located transverse the car. The pin 31 projects above the car, being employed to select the siding 8 where goods or packages are to be delivered.

Each siding 8 has associated with it mechanism for stopping a car 21 on the main conveyer and for releasing the said car upon the approach of another car 21a (Fig. 1) along the main conveyer. This mechanism is similar at the several sidings and will be understood by reference to Figs. 1 to 5 of the drawings which illustrate the mechanism at one siding. A pair of stop arms 33 are pivoted in bearings 34 and have rollers 35 projecting from their free ends to engage the cars 21. Supports for the bearings 34 comprise vertical members 36 and oblique braces 37 secured to the rails 15 and guide bars 17, respectively. Pivot pins for the stop arms 33 are integral with cranks 38 and these cranks are connected together by a cross bar 39 which is offset upward out of the path of the cars 21. The stop arms 33 are movable in unison from the full line to the dotted line position indicated in Fig. 1, being disposed in alignment with each other transverse the main conveyer so as to simultaneously engage the front end of the cars 21. To limit downward movement of the arms 33, a stop screw 40 is mounted beneath each on a bracket 41.

The stop arms 33 are movable by a rod 42 secured at one end to the cross bar 39 and at its other end to a crank 43 fixed on a horizontal shaft 44. This shaft is revoluble in bearings 45 having suitable supports projecting upward from the side rails 15. On the shaft 44 is secured an operating lever 46 adapted to be engaged by the pin 31 in one of its positions on the car 21. The levers 44 at the several sidings 8 are each disposed to coact with the pin 31 in one of its positions only.

A crank 47 projects downward from the shaft 44 and has connected to its free end a rod 48 which extends to a crank 49 fixed on a shaft 50. The latter shaft is free to oscillate in a bearing 51 having an upright frame member 52 and an actuating lever 53. The lever 53 projects into the path of the cars 21 and 21a on the main conveyer for rendering the stop arms 33 inoperative. To retain the several elements either in the full line or dotted line positions shown in Fig. 1, a spring 54 has one end secured to a fixed support 55 on its other end secured to a projecting bolt 56 fixed on the crank 49. The spring 54 moves from one side to the other of the axis of the shaft 50 when the crank 49 is moved from its full line to its dotted line position and vice versa. Motion of the crank 49 and connected parts in one direction is limited by a stop screw 57 threading in a supporting plate 58 secured to the frame member 52. Motion in the opposite direction is limited by the stop screws 40.

Operation

My improved system is adapted for use with a large variety of loads, either in suitable containers or directly supported on the conveyer. The loads may be placed on the main conveyer at one or more dispatching points, as required. The stop arms 33 at the several sidings are normally retained in inoperative position by the springs 54. An operator at a despatching point, in order to send one or more articles or packaged units of the load to a particular siding, places one of the pilot cars 21 on the main conveyer in advance of the load and adjusts the pin 31 to a position on the support 30 corresponding to the position of the lever 46 at the siding where the load is to be delivered. The arm 26 is secured in its right or left position depending on the direction in which the selected siding extends from the main conveyer. The pilot car is then released and one or more load units or articles to be conveyed are placed on, or otherwise delivered to, the main conveyer behind said car. The car and separate articles now travel along the main conveyer until the pin 31 strikes and actuates a lever 46 in its path. This moves the associated stop arms 33 to operative position, as indicated in full lines in Fig. 1, and the pilot car, after striking the lever 46, is further advanced until it strikes the rollers 35 on the arms 33. Now one of the surfaces 22 and the flap 23 are located in proper position to direct the articles to the siding. Any number of articles may thus be directed to any siding.

To send other articles to another siding, a second pilot car (21a, Fig. 1) is placed on the main conveyer at the despatching point for the load, the pin 31 on the second car is adjusted and the flap 23 is set to divert at the selected siding. The pilot car 21a and load is then released and travels along the main conveyer. When a second car 21a reaches the actuating lever 53 associated with a siding where a car 21 is standing, the pilot car 21a actuates the lever 53 and raises the stop arms 33 out of the path of the car 21. Both cars now travel along the main conveyer and after completing the circuit are delivered at the starting or despatching point. When the pin 31 on the car 21a engages the lever 46 at the siding where the second load is to be delivered, the stop arms 33 at this selected station are extended into the path of the car to thereby stop it in advance of the load. The diverter members 22 and 23 at the rear of the car now perform their function of diverting the separate, advancing articles or other load units at the selected siding.

My improved system requires a minimum of handling of the pilot cars and the diverting mechanism operates efficiently with loads of widely different kinds, sizes and shapes.

Having described my invention what I claim as new and desire to protect by Letters Patent is:

1. In a conveyer system, a main conveyer, a siding to receive articles from said main conveyer, a pilot car movable along said main conveyer, means for stopping said pilot car on the main conveyer adjacent to said siding, means on said car for directing articles to said siding and means on said car for rendering said stopping means operative.

2. In a conveyer system, a main conveyer, a siding to receive articles from said main conveyer, a pilot car movable along said main conveyer, means for stopping said pilot car adjacent to said siding, means on said car for directing articles to said siding, actuating means for said stop, a control for said actuating means and means on said pilot car for operating said control.

3. In a conveyer system, a main conveyer, a siding to receive articles from said conveyer, a pilot car movable along said conveyer, means on said car for diverting articles to said siding, a stop movable into the path of said car to stop the same in position to divert articles to said siding, actuating means for said stop having an element projecting adjacent to the path of said car and a device on said car adapted to engage said element.

4. In a conveyer system, a main conveyer, a siding to receive articles from said main conveyer, pilot cars movable along said main conveyer, means associated with said siding for stopping a pilot car adjacent to said siding, means on said cars for directing articles to said siding, devices on said cars for rendering said stopping means operative and means associated with said siding for rendering said stopping means inoperative upon the approach of a second car along said main conveyer.

5. In a conveyer system, a main conveyer, sidings to receive articles from said conveyer, a pilot car movable along said conveyer, means on said car for diverting articles to said siding, means associated with each of said sidings for stopping said car on the main conveyer in position to divert articles to said siding and a selecting device on said car adapted to be positioned thereon to coact with said stopping means at a selected siding.

6. In a conveyer system, a main conveyer, sidings to receive articles from said conveyer, pilot cars movable along said conveyer, means on said cars for diverting articles to said sidings, means associated with each of said sidings for stopping a car on the main conveyer in position to divert articles to said siding, a selecting device on said car adapted to be positioned thereon to coact with said stopping means at a selected siding to render the same operative and means associated with each siding for rendering the stopping means inoperative upon the approach of a second car along the main conveyer.

7. In a conveyer system, a main conveyer, a siding to receive articles from said conveyer, pilot cars movable along said conveyer, means on said cars for diverting articles moving behind the same to said siding, means for stopping said car in position to divert articles to said siding, actuating means for said stopping means having an element projecting adjacent to the path of said car, a device on said car adapted to be positioned thereon to engage said element and a second element of said actuating means projecting into the path of said cars to render said stopping means inoperative.

8. In a conveyer system for handling articles adapted to be supported directly on a conveyer, a main conveyer having power-driven elements to propel said articles therealong, sidings to receive said articles from said conveyer and a combined pilot car and diverter adapted to travel along said conveyer and having a diverting surface on its rear end to direct said articles to selected sidings and means on said car for automatically selecting a siding where the articles are to be diverted.

9. The combination with a main conveyer having sidings spaced therealong to receive articles from said conveyer, of a pilot car movable along said conveyer, means on said car adapted to be set to select a siding, a surface on said car for guiding said articles from the main conveyer to said siding and means at each siding to coact with said selecting device in stopping said car in position for diverting articles to said siding.

10. In a conveyer system for handling articles to be supported directly on a conveyer, a main conveyer having power-driven elements to propel said articles therealong, a siding to receive said articles from said conveyer, a combined pilot car and diverter adapted to travel along said conveyer and having a diverting surface on its rear end to direct said articles to said siding, a stop movable into the path of said car on the main conveyer, a lever having connection with said stop, a device on said car adapted to be set to engage said lever for rendering said stop operative and a second lever connected to said stop and spaced longitudinally of the conveyer from said first lever to be engaged by a car for rendering said stop inoperative.

In testimony whereof, I have hereunto signed my name to this specification.

SMITH EGGLESTON.